(12) United States Patent
Cormley (10) Patent No.: US 11,118,689 B2
(45) Date of Patent: Sep. 14, 2021

(54) VALVE

(71) Applicant: GOBUBL LIMITED, London (GB)

(72) Inventor: Michael David Cormley, London (GB)

(73) Assignee: GOBUBL LIMITED, London (GB)

(*) Notice: Subject to any disclaimer, the term of this patent is extended or adjusted under 35 U.S.C. 154(b) by 0 days.

(21) Appl. No.: 15/748,124

(22) PCT Filed: Jul. 29, 2016

(86) PCT No.: PCT/GB2016/052341
§ 371 (c)(1),
(2) Date: Jan. 26, 2018

(87) PCT Pub. No.: WO2017/017471
PCT Pub. Date: Feb. 2, 2017

(65) Prior Publication Data
US 2018/0252318 A1  Sep. 6, 2018

(30) Foreign Application Priority Data

Jul. 29, 2015  (GB) ..................................... 1513361

(51) Int. Cl.
*F16K 1/30* (2006.01)
*F16K 17/02* (2006.01)
(Continued)

(52) U.S. Cl.
CPC .......... *F16K 1/306* (2013.01); *B01F 3/04794* (2013.01); *F16K 1/307* (2013.01);
(Continued)

(58) Field of Classification Search
CPC ........ F16K 1/306; F16K 1/307; F16K 17/025; Y10T 137/7821; Y10T 137/7801;
(Continued)

(56) References Cited

U.S. PATENT DOCUMENTS 3,513,872 A * 5/1970 Tupper .................. F16K 15/026
137/484.2
3,542,063 A  11/1970 Etter et al.
(Continued)

FOREIGN PATENT DOCUMENTS

CN  2074407 U  4/1991
CN  1401061  3/2003
(Continued)

OTHER PUBLICATIONS

International Search Report issued in PCT/GB2016/052341 dated Nov. 2, 2016.
(Continued)

*Primary Examiner* — Jessica Cahill
(74) *Attorney, Agent, or Firm* — DLA Piper LLP (US)

(57) ABSTRACT

A valve comprising a first chamber (111) and a second chamber (112), wherein a movable member (204) is arranged to selectably bring the first and second chambers into and out of fluid communication with one another, the movable member arranged such that when in an open position wherein the first and second chambers are in fluid communication, gas at a first pressure in the first chamber provides a closing force to a first surface area (222) of the movable member to overcome an opening force provided by gas at a second pressure in the second chamber on a second surface area (223) of the movable member whereby the movable member moves to a closed position to isolate the first and second chambers, and further arranged wherein as the movable member moves to the closed position, the second surface area of the movable member exposed within the second chamber is reduced thus reducing the opening force provided by the gas at the second pressure and providing a bias towards the closed position.

18 Claims, 6 Drawing Sheets

(51) Int. Cl.
*B01F 3/04* (2006.01)
*F17C 13/04* (2006.01)

(52) U.S. Cl.
CPC ............ *F16K 17/025* (2013.01); *F17C 13/04* (2013.01); *F17C 2205/0103* (2013.01); *F17C 2205/0329* (2013.01); *F17C 2221/013* (2013.01); *F17C 2223/0123* (2013.01); *F17C 2223/035* (2013.01); *F17C 2270/0736* (2013.01)

(58) Field of Classification Search
CPC ......... Y10T 137/7754; Y10T 137/7739; Y10T 137/7738; Y10T 137/774; B01F 3/04794; F17C 13/04; F17C 2205/0329; F17C 2221/013; F17C 2223/0123; F17C 2223/035; F17C 2270/0736
See application file for complete search history.

(56) References Cited

U.S. PATENT DOCUMENTS

| | | | | |
|---|---|---|---|---|
| RE28,842 E | * | 6/1976 | Butterfield | F16K 17/0433 137/470 |
| 4,489,751 A | * | 12/1984 | Acomb | G05D 16/0633 137/484.8 |
| 5,261,447 A | * | 11/1993 | Boticki | G05D 16/163 137/493.2 |
| 5,487,850 A | | 1/1996 | Vanderploeg | |
| 6,792,972 B2 | | 9/2004 | Poulsen | |
| 7,178,551 B2 | * | 2/2007 | Wiederkehr | F16K 1/306 137/505.18 |
| 8,156,961 B2 | | 4/2012 | Denis et al. | |
| 8,245,730 B2 | * | 8/2012 | Nomichi | F16K 31/0693 137/630.15 |
| 2003/0010384 A1 | * | 1/2003 | Poulsen | F16K 17/046 137/484.2 |
| 2004/0206401 A1 | * | 10/2004 | Hecking | G05D 16/0661 137/505.18 |
| 2009/0223580 A1 | * | 9/2009 | Denis | F16K 1/306 137/614.19 |
| 2010/0288371 A1 | * | 11/2010 | Na | F16K 17/04 137/14 |
| 2011/0068284 A1 | * | 3/2011 | Jorgensen | G05D 7/0106 251/46 |
| 2011/0174394 A1 | * | 7/2011 | Kristoffersen | G05D 7/0133 137/505 |
| 2014/0239207 A1 | | 8/2014 | Ninomiya et al. | |
| 2017/0102091 A1 | * | 4/2017 | Hunt | B23P 19/00 |

FOREIGN PATENT DOCUMENTS

| | | |
|---|---|---|
| CN | 101289135 | 10/2008 |
| CN | 101297151 | 10/2008 |

OTHER PUBLICATIONS

Written Opinion issued in PCT/GB2016/052341 dated Nov. 2, 2016.
Great Brittain Search Report issued in Application No. GB1513361.4 dated Ausugt 11, 2016.
Chinese Office Action issued in Application No. 201680054803.2 dated Mar. 27, 2019.
Chinese Office Action issued in Application No. 201680054803.2 dated May 8, 2020.
Chinese Office Action issued in Application No. 201680054803.2 dated Feb. 2, 2021.
Great Britain Search Report issued in Application No. GB1513361.4 dated Mar. 3, 2020.

* cited by examiner

VALVE

This invention relates to a valve. It is particularly suitable for, but by no means limited to the carbonation of beverages for consumption, especially with pressurised $CO_2$ gas by providing a pressure reduction from the gas source to the desired beverage to be carbonated.

BACKGROUND

Systems to re-carbonate beverages are well known.

Whether a particular system performs well can be influenced by a number of factors such as the degree of re-carbonation obtainable, the pressure required in the gas canister for acceptable operation, the degree of pressure release required by way of venting to atmosphere during normal operation, and forces required to secure or release the system to or from the beverage vessel in question, for example.

Such systems often comprise numerous moving parts which can, typically, be complicated to manufacture and maintain.

The frequency with which a consumer desires to re-carbonate their beverage maybe high, in which case, the stresses and strains on the moving parts of the particular re-carbonating system can be significant.

It is therefore desirable to provide an improved and less cumbersome re-carbonation system whereby desirable properties such as avoidance of accidental discharge whilst in storage, avoidance of venting to atmosphere during normal operation, avoidance of freezer burn and icing of the re-carbonation mechanism during use as well as control of any venting to atmosphere are maintained.

SUMMARY

According to a first aspect there is provided a valve as defined in claim 1 of the appended claims. Thus there is provided a valve comprising a first chamber and a second chamber, wherein a movable member is arranged to selectably bring the first and second chambers into and out of fluid communication with one another, the movable member arranged such that when in an open position wherein the first and second chambers are in fluid communication, gas at a first pressure in the first chamber provides a closing force to a first surface area of the movable member to overcome an opening force provided by gas at a second pressure in the second chamber on a second surface area of the movable member whereby the movable member moves to a closed position to isolate the first and second chambers, and further arranged wherein as the movable member moves to the closed position, the second surface area of the movable member exposed within the second chamber is reduced thus reducing the opening force provided by the gas at the second pressure and providing a bias towards the closed position.

Optionally, the second chamber further comprises a bore in mating arrangement with a shaft of the movable member wherein as the movable member moves to the closed position, the shaft of the movable member is arranged to move into a sealed relationship with the bore to reduce the second surface area of the movable member exposed within the second chamber.

Optionally, the shaft of the movable member comprises a smaller diameter than the rest of the movable member located within the second chamber.

Optionally, wherein a distal portion of the shaft is arranged to couple with the bottom of the bore to provide the closed position when a predetermined pressure occurs in the first chamber.

Optionally, the valve is further arranged such that when the force on the second surface area of the movable member is larger than the force on the first surface area of the movable member, the movable member moves to an open position to fluidly connect the first and second chambers.

Optionally, wherein as the movable member moves to the open position from the closed position, the second surface area exposed within the second chamber is increased.

Optionally, the shaft of the movable member is arranged to move out of a sealed relationship with the bore to increase the second surface area exposed within the second chamber.

Optionally, the valve further comprises an outlet selectably in fluid communication with the first chamber.

Optionally, the valve further comprising an outlet valve arranged to be biased to a normally closed position by a closing force of the gas within the first chamber to isolate the first chamber from the outlet.

Optionally, the outlet valve comprises a needle valve.

Optionally, the outlet valve is arranged to be forced into an open position whereby the first chamber is in fluid communication with the outlet.

Optionally, the valve wherein the pressure of gas exiting the outlet is lower than the second pressure Optionally, the valve further comprises an insert for piercing a seal of a pressurised gas cartridge to provide gas to the second chamber.

Optionally, the movable member further comprises a passageway coupling the first chamber with a third chamber.

Optionally, the passageway comprises a deformable bung.

Optionally, the bung is arranged to be forced from the passageway when a predetermined pressure occurs in the first chamber so as to bring the first chamber and the third chamber into fluid communication.

Optionally, the third chamber is at ambient pressure and is arranged to allow excess pressure to be vented to atmosphere.

Optionally, the valve wherein the first surface area is larger than the second surface area.

Optionally, the valve wherein the first pressure is lower than the second pressure.

Optionally, the valve wherein the movable member comprises a piston.

Optionally, the valve further arranged wherein a pressure drop of 10 psi in the first chamber allows movement from the closed position to the open position.

According to a second aspect there is provided a method as defined in claim 22. Thus there is provided a method comprising providing a valve comprising a first chamber and a second chamber, wherein a movable member selectably brings the first and second chambers into and out of fluid communication with one another, wherein when in an open position wherein the first and second chambers are in fluid communication, gas at a first pressure in the first chamber provides a closing force to a first surface area of the movable member to overcome an opening force provided by gas at a second pressure in the second chamber on a second surface area of the movable member whereby the movable member moves to a closed position to isolate the first and second chambers, and as the movable member moves to the closed position, the second surface area of the movable member exposed within the second chamber is reduced thus reducing the opening force provided by the gas at the second pressure and providing a bias towards the closed position.

Optionally, the method wherein the second chamber further comprises a bore in mating arrangement with a shaft of the movable member wherein as the movable member moves to the closed position, the shaft of the movable member moves into a sealed relationship with the bore to reduce the second surface area of the movable member exposed within the second chamber.

Optionally, the method wherein the shaft of the movable member comprises a smaller diameter than the rest of the movable member located within the second chamber.

Optionally, the method wherein a distal portion of the shaft couples with the bottom of the bore to provide the closed position when a predetermined pressure occurs in the first chamber.

Optionally, the method wherein when the force on the second surface area of the movable member is larger than the force on the first surface area of the movable member, the movable member moves to an open position to fluidly connect the first and second chambers.

Optionally, the method wherein as the movable member moves to the open position from the closed position, the second surface area exposed within the second chamber is increased.

Optionally, the method wherein the shaft of the movable member moves out of a sealed relationship with the bore to increase the second surface area exposed within the second chamber.

Optionally, the method wherein the valve further comprising an outlet selectably in fluid communication with the first chamber.

Optionally, the method further comprising an outlet valve biased to a normally closed position by a closing force of the gas within the first chamber to isolate the first chamber from the outlet.

Optionally, the method wherein the outlet valve comprises a needle valve.

Optionally, the method wherein the outlet valve is forced into an open position whereby the first chamber is in fluid communication with the outlet.

Optionally, the method wherein the pressure of gas exiting the outlet is lower than the second pressure Optionally, the method wherein the valve further comprises an insert for piercing a seal of a pressurised gas cartridge to provide gas to the second chamber.

Optionally, the method wherein the movable member further comprises a passageway coupling the first chamber with a third chamber.

Optionally, the method wherein the passageway comprises a deformable bung.

Optionally, the method wherein the bung is forced from the passageway when a predetermined pressure occurs in the first chamber so as to bring the first chamber and the third chamber into fluid communication.

Optionally, the method wherein the third chamber is at ambient pressure and allows excess pressure to be vented to atmosphere.

Optionally, the method wherein the first surface area is larger than the second surface area.

Optionally, the method wherein the first pressure is lower than the second pressure.

Optionally, the method wherein the movable member comprises a piston.

Optionally, the method wherein a pressure drop of 10 psi in the first chamber allows movement from the closed position to the open position.

With all the aspects, preferable and optional features are defined in the dependent claims.

BRIEF DESCRIPTION OF THE DRAWINGS

Embodiments will now be described, by way of example only, and with reference to the drawings in which.

In the figures, like elements are indicated by like reference numerals throughout.

Overview

Disclosed herein is an improved re-carbonation valve wherein gas shut-off pressure is substantially different (larger) to the valve re-opening pressure hence ensuring accidental discharge without a beverage vessel is avoided. This is achieved without the use of biasing members, for example springs, which can deform and degenerate with use. A movable member of the valve utilises forces derived from gas pressures on defined surface areas within two chambers of the valve to provide desired operation of the valve.

Accordingly, there is provided a valve comprising a positive valve closure whereby when closed and connected to a gas source, only a low pressure is required in an outlet chamber for the valve to remain closed. This forms a safe and reliable seal and maintains the valve in a safe closed state which is suitable for storage. This low pressure must be reduced substantially for the valve to reopen and allow re-gassing. Such a reduction in pressure only occurs when the valve is coupled to a vessel to be re-carbonated and hence avoids accidental discharge which may be dangerous.

Hence, an improved valve is provided allowing simplification of construction and maintenance.

DETAILED DESCRIPTION

Figure 1:
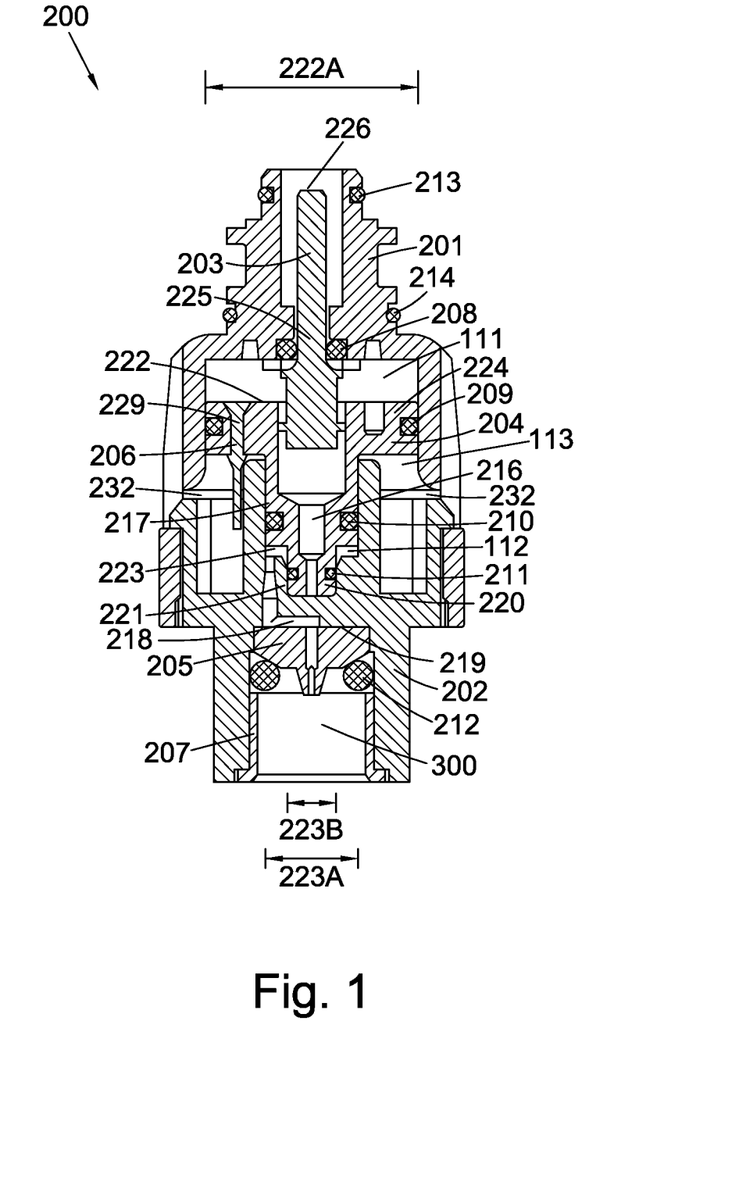
FIG. 1 illustrates a valve according to an embodiment.

FIG. 1 illustrates a valve 200 according to an embodiment. Valve 200 may comprise a valve upper body 201 and a valve lower body 202. Valve 200 comprises a first chamber 111 and a second chamber 112. The first and second chambers may be in axial alignment. A movable member 204 is arranged to move between an open position where the first and second chambers are in fluid communication and a closed position where the first and second chambers are isolated. The movable member may comprise a piston. Movable member 204 comprises a conduit 216 there within. The conduit links a first side of the movable member comprising a first surface area 222 residing in the first chamber 111 to a second side of the movable member comprising a second surface area 223 residing in the second chamber 112. The first surface area 222 has a diameter 222A. The second surface area 223 has a diameter 223A.

Diameter 223A may be smaller than diameter 222A. Movable member 204 is slidably disposed within an axial conduit 217. Axial conduit 217 may link the first chamber 111 with the second chamber 112. A seal 210 is disposed around the outside edge of a first portion of the movable member that is sized to move through conduit 217 so as to seal the movable member to the conduit 217 and prevent fluid communication between the outside edge of the movable member and the conduit wall 217.

An inlet 218 may provide fluid communication from an outside edge 219 of valve 200 to the second chamber 112. A shaft 220 of movable member 204 may extend away from second surface area 223 and may have a smaller diameter 223B than diameter 223A. Shaft 220 comprises a mating arrangement with a bore 221 and may be sealed to bore 221 by way of seal 211. A portion 224 of movable member 204 isolates first chamber 111 from a third chamber 113. A seal 209 may be disposed on an outer edge of portion 224 of movable member 204 to provide the isolation. Portion 224 may have a diameter equal to the first surface area diameter 222. Chamber 113 may comprise a vent to atmosphere and hence be at ambient pressure.

Valve 203 may be disposed at an exit 225 of first chamber 111. Valve 203 may be sealed with a seal 208. Valve 203 may comprise a needle valve. Exit 225 is arranged so as to be selectably in fluid communication with an outlet 226. Outlet 226 may be coupled to a vessel to be re-carbonated.

The seals described above and herein may be annular seals, for example an O-ring.

Figure 2:
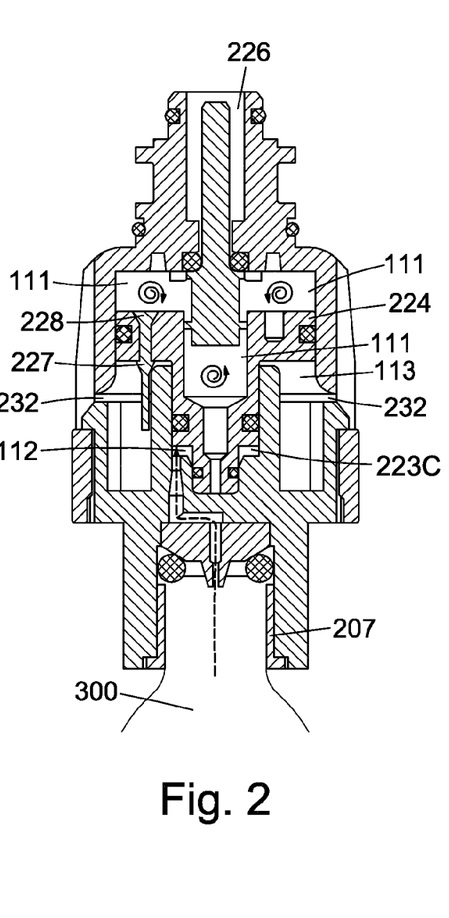
FIG. 2 illustrates a valve in a closed position according to an embodiment.

Turning to FIG. 2 which illustrates valve 200 in an initial closed position where the first chamber and the second chamber are isolated, a pressurised gas canister or other gas source 300 may be coupled to inlet 218 by way of insert 205 and optional sleeve 207 and seal 212. Insert 205 may comprise a piercing insert to break a corresponding seal on the gas source 300 and a passageway 231 in fluid communication with inlet 218. Pressurised gas may therefore enter the inlet 218 and into second chamber 112. The pressurised gas acts on the exposed surface area 223C of the movable member 204 that resides within chamber 112 and forces the movable member in direction 230 towards an open position where the first chamber and the second chamber are in fluid communication. As the movable member moves from the closed to the open position, seal 211 of shaft 220 will eventually exit bore 221 such that surface area 223B is also exposed to the pressurised gas of chamber 112. Further, conduit 216 enters into fluid communication with both the first chamber and the second chamber.

Gas in the second chamber 111 is at a higher pressure than gas within the first chamber 112. During normal operation, both chambers comprise gas at a higher pressure than ambient.

Gas continues to flow from the second chamber to the first chamber until a predetermined pressure is reached in the first chamber (with an ambient temperature of 20 degrees C., the predetermined pressure is approximately 120 psi). At this point, the force exerted on surface area 222 of the movable member residing within first chamber 111 by the gas within the first chamber overcomes the force exerted by the gas within the second chamber owing to the gas pressure and surface area sizes within the first and second chambers. The movable member 204 moves towards the closed position (direction 233) of FIG. 2 in a manner reverse to that when moving to the open position. Accordingly, at the point of movement towards the closed position when seal 211 of shaft 220 enters bore 221 such that surface area 223B is no longer exposed to second chamber 112, this reduces the force exerted on the movable member in direction 230 such that a bias is provided towards the closed position.

Residual pressure in first chamber 111 is lower than that in second chamber 112 however, due to the different exposed surface areas, the movable member remains in the closed position. This can be considered to be a steady-state of the valve and is suitable for storing in this state for long periods of time, such as in a consumer's kitchen.

Figure 3:
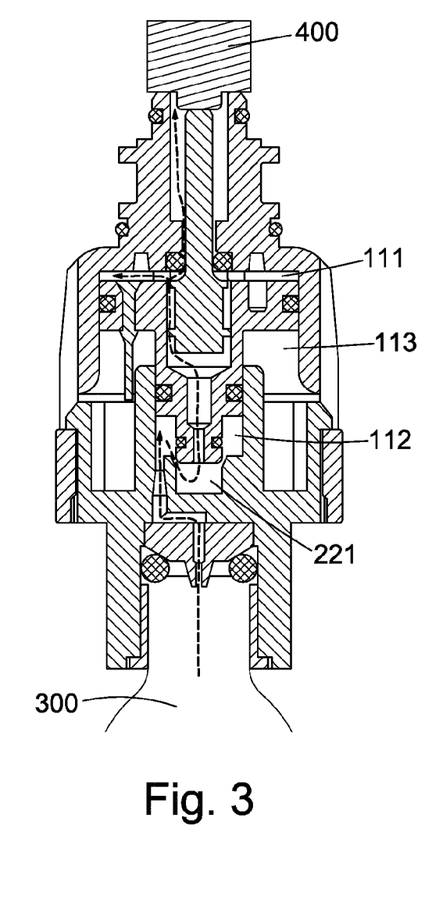
FIG. 3 illustrates a valve in an open position according to an embodiment.

Turning to FIG. 3, when re-carbonation of a vessel is desired, valve 203 is depressed such that the first chamber is in fluid communication with the outlet 226. Valve 203 maybe depressed by way of an insert 400. As can be seen in FIG. 3, starting from the closed state of FIG. 2, when insert 400 engages with valve 203 to depress the valve, the pressure in the first chamber will reduce as the gas will exit the outlet 226 and into the next stage of the system (see FIGS. 5 to 9). The force of the pressure in the second chamber biasing the movable member towards the open position will, at a predetermined pressure, overcome the force in the first chamber biasing the movable member towards the closed position. With an ambient temperature of 20 degrees C., when the pressure in the first chamber has reduced to approximately 110 psi to 115 psi, the opening force of the higher pressure in the second chamber (which is acting on a reduced second surface area 223 owing to shaft 220 being positioned within bore 221 as previously described) overcomes the opposing closing force from the first chamber. Accordingly, the movable member will move to the open position of FIG. 3. As valve 203 is depressed, pressurised gas will flow from the gas source and out of the outlet 226 as indicated by the broken arrow in FIG. 3. Owing to the action of the pressure reducing valve, the pressure of the gas flowing out of the gas source which is typically at a pressure of 730 to 930 psi is reduced to approximately 100 to 140 psi at outlet 226 depending on the ambient temperature.

As can be seen, at typical operating conditions, an approximate reduction in the pressure within the first chamber of about 10 psi is enough to overcome the bias towards the closed position, and allow gas to flow from the outlet 226 at a reduced pressure. Such a differential in closing pressure (120 psi) and opening pressure (110-115 psi) in the first chamber provides a consistent and predictable opening and closing action, and avoids repetitive oscillations between the first and second chambers being in fluid communication with one another, and not being in fluid communication with one another. If the differential between opening and closing pressures were, for example, closing at 120 psi and opening at 119 psi, there could be inconvenient, and uncomfortable repetitive oscillations that could also result in excess wear to the valve (including the various seals used there within) which would shorten its operational life.

Figure 4:
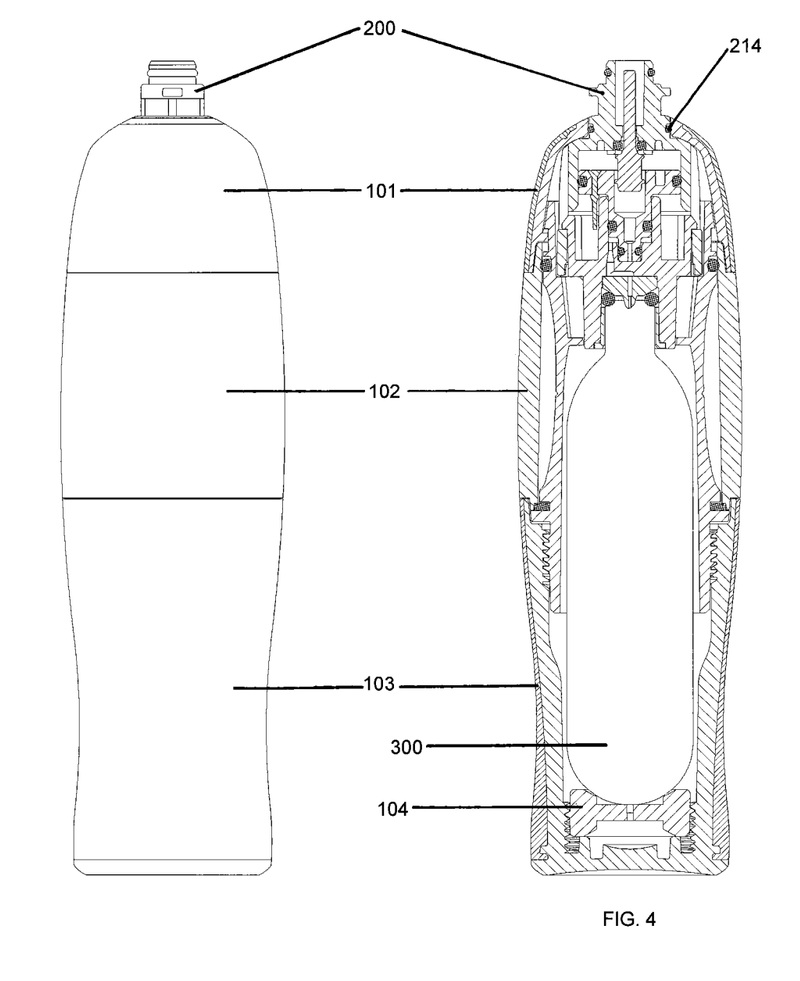
FIG. 4 illustrates a valve installed in a housing with a gas source according to an embodiment.

FIG. 4 illustrates a valve 200 installed in a housing 100 with a gas source 300. Housing 100 may comprise any number of portions. FIG. 4 shows three portions 101, 102, 103. Portion 101 may generally house valve 200, portion 103 may generally house gas source 300 and may also comprise gas cartridge adapter 104, and portion 102 may connect portions 101 and 103 such that the valve and gas source are contained. Seal 214 seals valve 200 into housing portion 101. Any of the portions 102 may be see-through. When the portions of the housing are positioned for use, for example screwed together or a push-fit arrangement, insert 205 may pierce a seal on the gas source 300 and pressurised gas may flow into valve 200 as described previously.

As described in relation to FIG. 3, gas delivery to a vessel may be instigated by way of an insert 400 depressing valve 203.

Figures 5, 6:
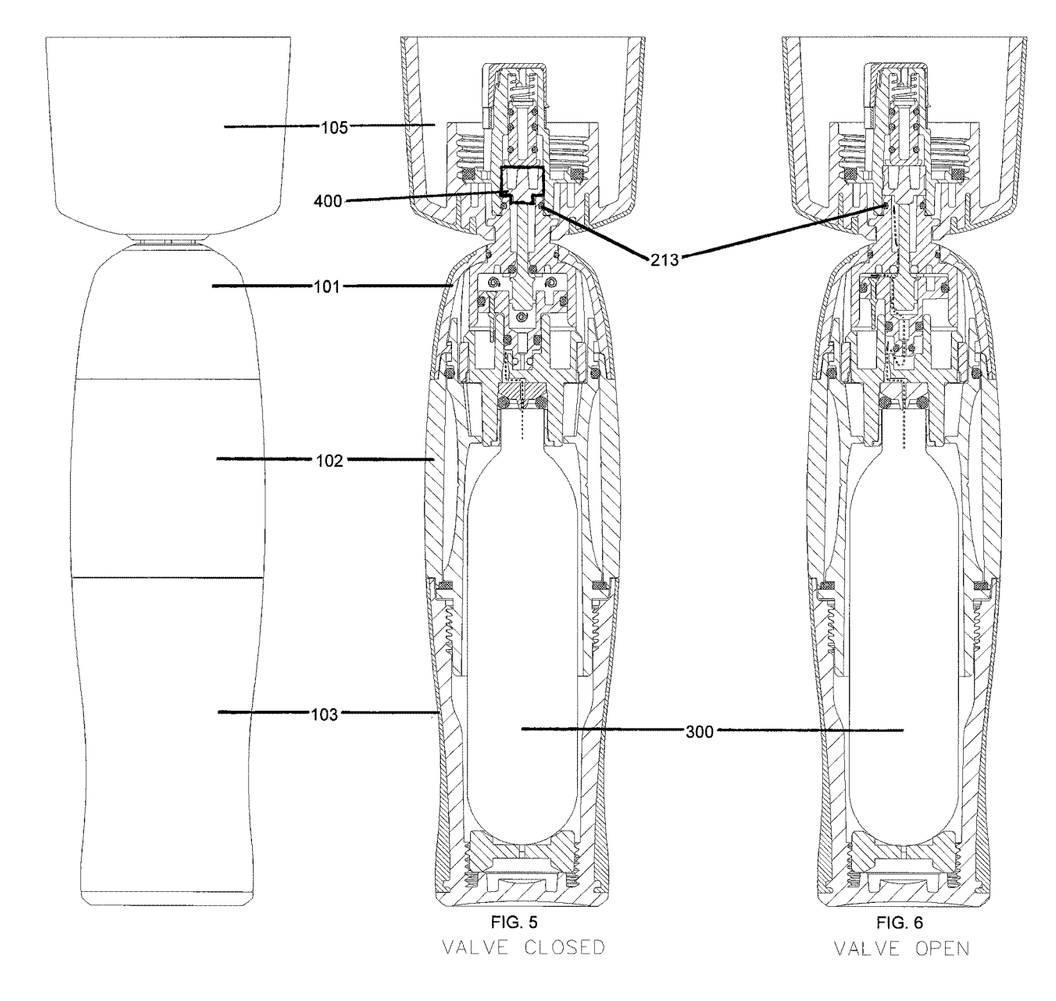
FIG. 5 illustrates a valve in a closed position coupled to a valve cap of a vessel according to an embodiment.
FIG. 6 illustrates a valve in an open position coupled to a valve cap of a vessel according to an embodiment.

Following on from FIG. 4, FIG. 5 illustrate a valve in a closed position coupled to a valve cap of a vessel 105, and FIG. 6 illustrates a valve in an open position coupled to a valve cap of a vessel 105. Insert 400 is highlighted in FIG. 5 for convenience. Seal 213 seals valve 200 into the valve cap.

When the valve is coupled to a gas source 300 and there is an ambient temperature of 20 degrees C., typical pressures in the various parts of the valve may be as follows:

Gas source 300—800 psi
Second chamber 112—800 psi
Bore 221—800 psi
First chamber 111—120 psi
Outlet 226—120 psi
Third chamber 113—ambient The pressure of the pressurised gas source may differ according to the following ambient temperatures:

15 degrees C.—734 psi
20 degrees C.—837 psi
25 degrees C.—928 psi

Figure 7:
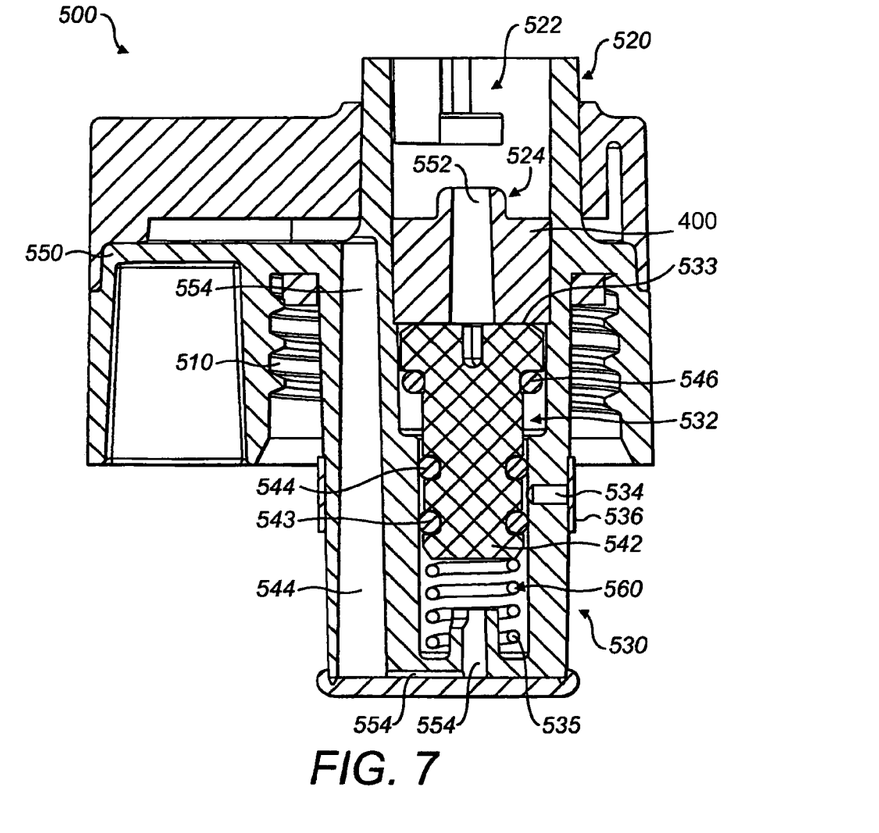
FIG. 7 illustrates a cap assembly according to an embodiment.

Accordingly, the output pressure at outlet 226 may differ in line with the pressure of the pressurised gas source according to:

Input (gas source 300) 700 psi, output (outlet 226) 102 psi
Input (gas source 300) 800 psi, output (outlet 226) 120 psi
Input (gas source 300) 900 psi, output (outlet 226) 138 psi In other embodiments, the output pressure at outlet 226 may differ in line with the pressure of the pressurised gas source according to:

Input (gas source 300) 700 psi, output (outlet 226) 55 psi
Input (gas source 300) 800 psi, output (outlet 226) 60 psi
Input (gas source 300) 900 psi, output (outlet 226) 65 psi Turning to FIG. 7, cap assembly 500 includes a sealing portion 510, an entrance port 520 and an exit port 530. In use the sealing portion 510 seals to a vessel to be carbonated (not shown). The entrance port 520 is in communication with an outside of the vessel and may receive gas from the outlet 226 of the valve 200 when insert 400 engages with a seal of a gas source as described previously. The exit port 534 is in communication with an inside of the vessel. A valve is arranged to open and close the exit port 530. The valve is biased to close the exit port 534.

Referring to FIG. 7, the entrance port 520 includes a socket 522 for receiving the discharge port of the outlet 226 of the valve 200. A distal end of the socket 522 includes an upwardly extending protrusion 524 centred on an axis of the socket. In use, when the outlet 226 is inserted into the socket 522, the protrusion 524 abuts a distal end of the outlet valve 203. It will be appreciated that this abutment causes the outlet valve to move to the open position such that the first chamber is in fluid communication with the outlet. A passageway 552 connects the distal end of the socket 522 with a second chamber 532. The second chamber is formed in the exit port. An exit 534 vents 15 the second chamber 532 to the inside of the vessel. The exit 534 includes a non-return valve to prevent fluid from passing from the vessel back into the second chamber 532. The non-return valve is shown as band 536. The valve is arranged within the second chamber in order to open and close the exit.

The valve suitably comprises a shut-off piston 542. Consequently, chamber 532 is substantially cylindrical. Here the exit 534 is formed in a cylindrical face of the chamber 532. The shut-off piston 542 is urged against one end face 533 of the chamber 532 by the carbonating pressure regulator 560 acting between the other end face 535 of the chamber 532 and a distal end of the shut-off piston 542. An end of the chamber housing the carbonating pressure regulator is vented to the atmosphere via passage 554.

Figure 8:
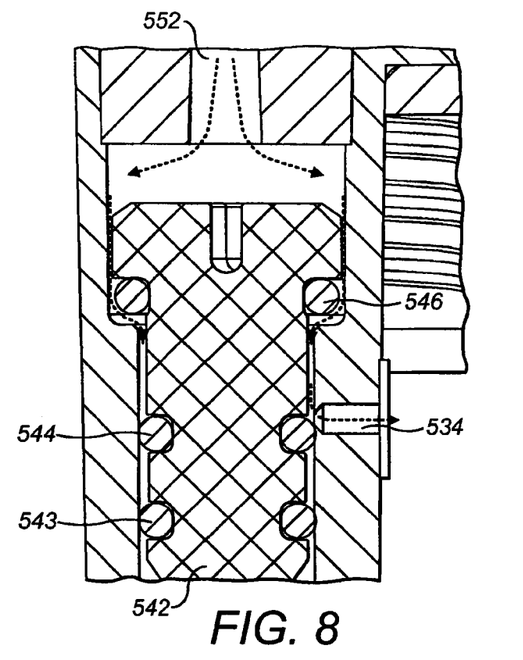
FIG. 8 illustrates an expanded view of FIG. 7 in a re-gassing configuration.
Figure 9:
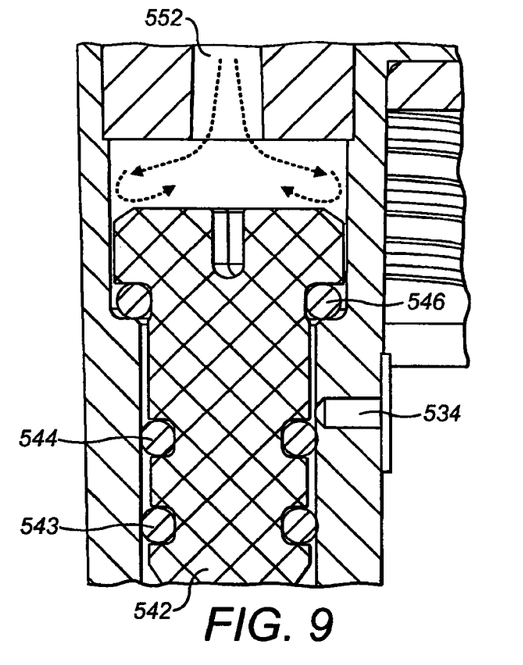
FIG. 9 illustrates an expanded view of FIG. 7 in a shut-off configuration.

The carbonating pressure regulator is suitably shown as a resilient member 560 such as a compression spring. When the shut-off piston 542 is urged against the face 533, under the biasing force of the resilient member 560, annular sealing rings 543, 544, which are seated on the piston, are arranged either side of the exit 534. Each annular sealing ring 543, 544 seals the piston to the chamber 532. Thus the exit 534 is closed. The passageway 552 enters the chamber 542 above the annular sealing ring 544 located between the exit 534 and the face 533. Consequently, gas enters from the passageway 552 and pressurises the chamber 532. This pressure acts on the sealing ring 544 to urge the shut-off piston 542 against the biasing force of the resilient member 560. As the pressure increases, the resilient member is compressed sufficiently so that the annular seal 544 passes the exit. Thus gas is discharged into the vessel in order to carbonate an empty space of the vessel (as shown in FIG. 8). As the empty space is filled with gas, the pressure increases, which increases the pressure within the chamber 532. The resilient member is arranged to compress such that exit 534 is closed by a seal 546 when the pressure within the chamber 532 exceeds a pre-determined compressive force (for example 30-45 psi or 90-110 psi). The seal 546 is shown as an annular sealing ring 546 seated under a piston head of the shut-off piston. The piston head is arranged in an area of increased diameter such that gas can flow around the head and between the head and walls of the chamber. Pressure from the gas acting on the piston head urges the sealing ring 546 to seat against a ledge in the chamber 532 as shown in FIG. 9 thereby shutting off the exit 534.

As would be understood, when exit 534 is shut off, the pressure in chamber 111 of valve 200 will rise such that movable member 204 is biased towards a closed position as previously described. Gas flow from the gas source is thereby halted. When the cap is released from the valve 200, valve 203 will return to the closed position and the valve 200 enters its steady-state position.

To improve manufacturability, the socket and shut-off piston 542 are all co-axial. Here the passageway 552 can be formed in insert 400 that is secured fast to and part way down a bore such that the bore on one side of the insert forms the socket and the bore on the other side of the insert forms the chamber 532. Passageway 552 may be formed by way of striations on the outer diameter of insert 400.

Returning to FIGS. 1 and 2 which show valve 200 in a closed position, shaft 220 of movable member 204 relies on seal 211 to form a seal between the shaft 220 and bore 221 such that exposed surface 223 is reduced as the shaft moves into the bore 221. Should seal 211 fail, shaft 220 is arranged to continue moving towards a final closed position where shaft 220 sits at the bottom of bore 221. The mating faces of shaft and bore form a seal in a safety valve arrangement which closes valve 200 at a pressure between 140 psi and 160 psi. Valve 200 may continue to operate in the same manner as described above (the movable member 204 moving between closed and open positions), however, the pressure differential between closing and opening positions will no longer be a function. The valve will open as soon as the pressure and hence force increases in chamber 112.

Valve 200 may comprise a conduit 229 extending through portion 224 of movable member 204 that isolates first chamber 111 from third chamber 113. The conduit may comprise a deformable bung 206. The bung may comprise a nitrile bung. The bung may comprise NBR shore 30a material. The bung may be of dimensions comprising approximately a 1.3 mm diameter shaft and a 3 mm countersunk head. In a normal operating position the bung may be held in place by a countersunk head 228 located in a corresponding countersink in the surface area 222 of movable member 204. The bung may further comprise a reverse countersink 227 where a flat surface locates on the third chamber side of portion 224 of movable member 204. The bung remains in the normal operating position until an over-pressurisation event occurs. Such an event occurs if a pressure of between 150 psi to 180 psi occurs in the first chamber 111. Should an over pressure event occur, for example due to a malfunction with valve 200 or cap assembly 500, the bung is forced from the conduit 229 by way of moving towards the third chamber as would be understood. Accordingly, the first chamber and the third chamber are brought into fluid communication and the excess pressure may be released to atmosphere by way of vents 232. The pressure at which the bung is forced from the conduit 229 is determined by the size of the countersunk head on the bung and the shore hardness of the bung material as would be understood.

The integration of the safety valve and the pressure release system guarantees that there is no catastrophic failure of the valve and ensures the safety of an operator. Further the arrangement of valve 200 allows a safe and reliable steady-state position which is suitable for storage.

The invention claimed is:

1. A valve comprising:
    a first chamber and a second chamber, wherein a movable member is arranged to selectably bring the first and second chambers into and out of fluid communication with one another;
    the movable member arranged such that when in an open position wherein the first and second chambers are in fluid communication, gas at a first pressure in the first chamber provides a closing force to a first surface area of the movable member to overcome an opening force provided by gas at a second pressure in the second chamber on a second surface area of the movable member whereby the movable member moves to a closed position to isolate the first and second chambers; and further arranged wherein
    as the movable member moves to the closed position, the second surface area of the movable member exposed within the second chamber is reduced to an exposed annular surface of the second surface area thus reducing the opening force provided by the gas at the second pressure a and providing a bias towards the closed position,
    wherein the movable member further comprises a passageway coupling the first chamber with a third chamber, wherein the passageway comprises a deformable bung and wherein the bung is arranged to be forced from the passageway when a predetermined pressure occurs in the first chamber so as to bring the first chamber and the third chamber into fluid communication.

2. The valve of claim 1 wherein the second chamber further comprises a bore in mating arrangement with a shaft of the movable member wherein as the movable member moves to the closed position, the shaft of the movable member is arranged to move into a sealed relationship with the bore to reduce the second surface area of the movable member exposed within the second chamber.

3. The valve of claim 2 wherein the shaft of the movable member comprises a smaller diameter than the rest of the movable member located within the second chamber.

4. The valve of claim 2 wherein a distal portion of the shaft is arranged to couple with the bottom of the bore to provide the closed position when a predetermined pressure occurs in the first chamber.

5. The valve of claim 1 further arranged such that when the force on the second surface area of the movable member is larger than the force on the first surface area of the movable member, the movable member moves to an open position to fluidly connect the first and second chambers.

6. The valve of claim 1 wherein as the movable member moves to the open position from the closed position, the second surface area exposed within the second chamber is increased.

7. The valve of claim 6 wherein the shaft of the movable member is arranged to move out of a sealed relationship with the bore to increase the second surface area exposed within the second chamber.

8. The valve of claim 1 further comprising an outlet selectably in fluid communication with the first chamber and an outlet valve arranged to be biased to a normally closed position by a closing force of the gas within the first chamber to isolate the first chamber from the outlet.

9. The valve of claim 8 wherein the outlet valve is arranged to be forced into an open position whereby the first chamber is in fluid communication with the outlet.

10. A method comprising:
    providing a valve comprising a first chamber and a second chamber, wherein a movable member selectably brings the first and second chambers into and out of fluid communication with one another; wherein
    when in an open position wherein the first and second chambers are in fluid communication, gas at a first pressure in the first chamber provides a closing force to a first surface area of the movable member to overcome an opening force provided by gas at a second pressure in the second chamber on a second surface area of the movable member whereby the movable member moves to a closed position to isolate the first and second chambers; and
    as the movable member moves to the closed position, the second surface area of the movable member exposed within the second chamber is reduced to an exposed annular surface of the second surface area thus reducing the opening force provided by the gas at the second pressure and providing a bias towards the closed position,
    wherein the movable member further comprises a passageway coupling the first chamber with a third chamber, wherein the passageway comprises a deformable bung and wherein the bung is forced from the passageway when a predetermined pressure occurs in the first chamber so as to bring the first chamber and the third chamber into fluid communication.

11. The method of claim 10 wherein the second chamber further comprises a bore in mating arrangement with a shaft of the movable member wherein as the movable member moves to the closed position, the shaft of the movable member moves into a sealed relationship with the bore to reduce the second surface area of the movable member exposed within the second chamber.

12. The method of claim 11 wherein the shaft of the movable member comprises a smaller diameter than the rest of the movable member located within the second chamber.

13. The method of claim 10 wherein a distal portion of the shaft couples with the bottom of the bore to provide the closed position when a predetermined pressure occurs in the first chamber.

14. The method of claim 10 wherein when the force on the second surface area of the movable member is larger than the force on the first surface area of the movable member, the movable member moves to an open position to fluidly connect the first and second chambers.

15. The method of claim 10 wherein as the movable member moves to the open position from the closed position, the second surface area exposed within the second chamber is increased.

16. The method of claim 15 wherein the shaft of the movable member moves out of a sealed relationship with the bore to increase the second surface area exposed within the second chamber.

17. The method of claim 10 wherein the valve further comprising an outlet selectably in fluid communication with the first chamber and an outlet valve biased to a normally closed position by a closing force of the gas within the first chamber to isolate the first chamber from the outlet.

18. The method of claim 17 wherein the outlet valve is forced into an open position whereby the first chamber is in fluid communication with the outlet.

* * * * *